United States Patent [19]
Muth et al.

[11] Patent Number: 5,246,132
[45] Date of Patent: Sep. 21, 1993

[54] MOTOR VEHICLE FUEL TANK FILLER NECK BLANKING COVER WITH A DETACHABLE GRIP WEB

[75] Inventors: Joachim Muth, Plettenberg; Dieter Scheurenbrand, Wolfschulgen; Lothar Mauz, Esslingen; Peter Weymann, Stuttgart, all of Fed. Rep. of Germany

[73] Assignee: Mercedes-Benz AG, Fed. Rep. of Germany

[21] Appl. No.: 13,235

[22] Filed: Feb. 3, 1993

Related U.S. Application Data
[63] Continuation of Ser. No. 846,341, Mar. 5, 1992.

[30] Foreign Application Priority Data
Mar. 5, 1991 [DE] Fed. Rep. of Germany ....... 4106864

[51] Int. Cl.$^5$ ............................................. B65D 41/32
[52] U.S. Cl. .............................. 220/266; 220/DIG. 33; 220/288
[58] Field of Search ............... 220/266, DIG. 33, 212, 220/288, 270

[56] References Cited
U.S. PATENT DOCUMENTS
| | | | |
|---|---|---|---|
| 4,177,931 | 12/1979 | Evans | 220/266 X |
| 4,402,420 | 9/1983 | Chernack | 220/266 |
| 4,678,097 | 7/1987 | Crute | 220/DIG. 33 X |
| 4,779,755 | 10/1988 | Harris | 220/203 |
| 4,854,471 | 8/1989 | Kasugai et al. | 220/DIG. 33 X |
| 4,887,733 | 12/1989 | Harris | 220/DIG. 33 X |
| 4,993,578 | 2/1991 | Kerby | 220/DIG. 33 X |

FOREIGN PATENT DOCUMENTS
0011780 11/1979 European Pat. Off. .
2657747 6/1978 Fed. Rep. of Germany .
2015073 2/1979 United Kingdom .

*Primary Examiner*—Allan N. Shoap
*Assistant Examiner*—Paul A. Schwarz
*Attorney, Agent, or Firm*—Evenson, McKeown, Edwards & Lenahan

[57] ABSTRACT
A blanking cover for the filler neck of a motor vehicle fuel tank has a grip protruding from the blanking cover body so as to ensure that reliable filler neck sealing is maintained in the case of a crash when a collision occurs between the grip and a body part. The grip can be released from the blanking cover body under the action of crash forces.

4 Claims, 1 Drawing Sheet

U.S. Patent  Sep. 21, 1993  5,246,132
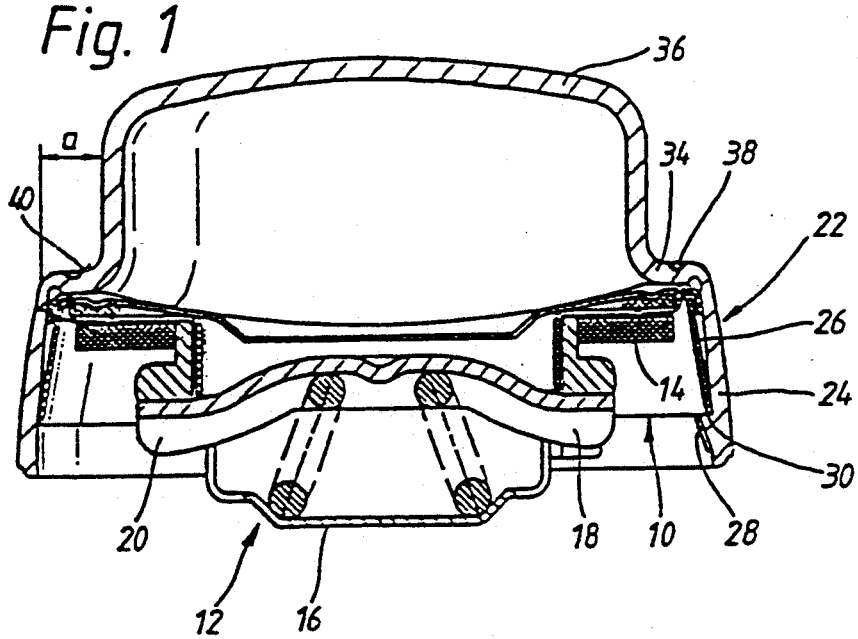
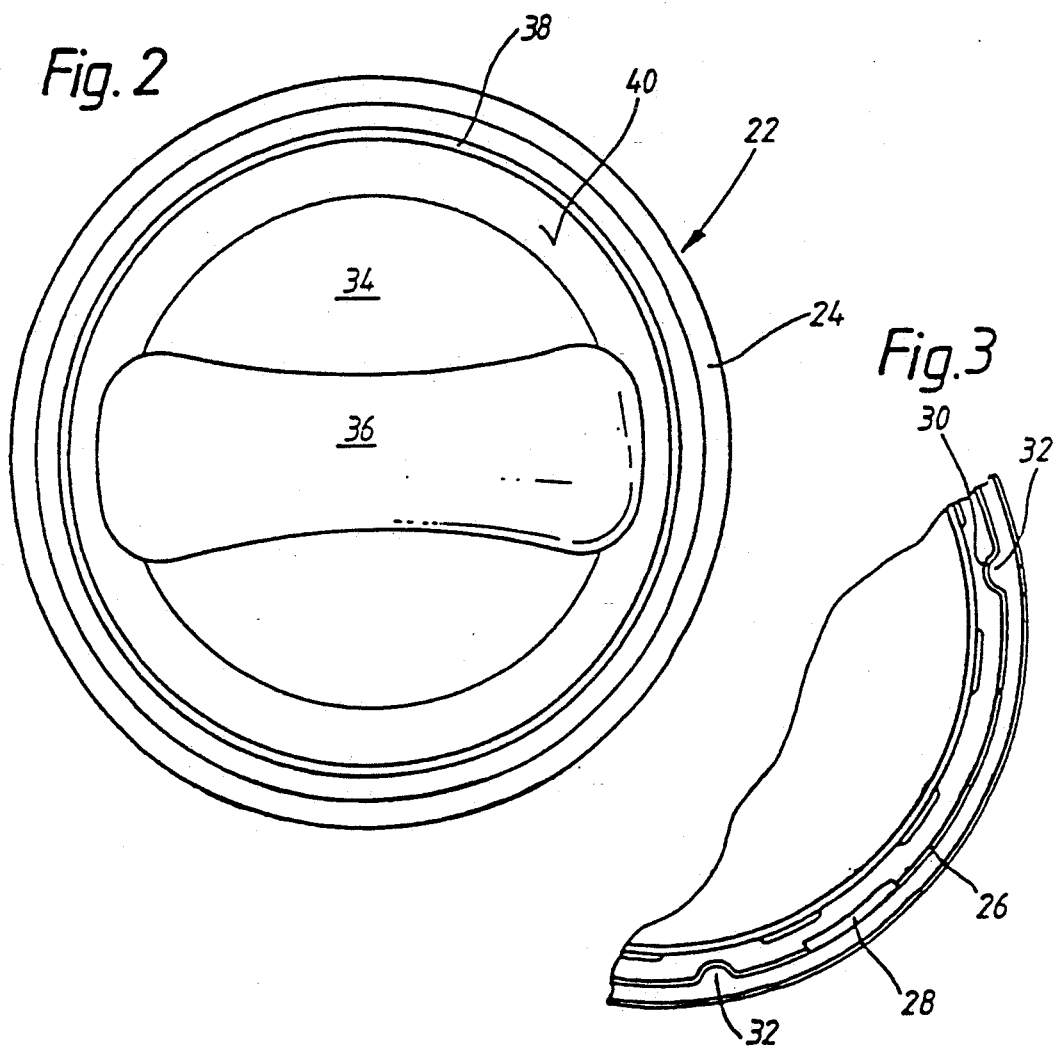
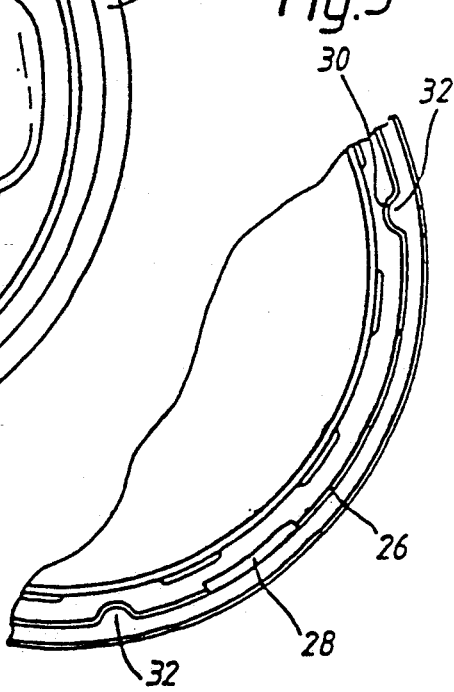

MOTOR VEHICLE FUEL TANK FILLER NECK BLANKING COVER WITH A DETACHABLE GRIP WEB

This is a continuation of application Ser. No. 07/846,341, filed Mar. 5, 1992.

BACKGROUND AND SUMMARY OF THE INVENTION

The present invention relates to a blanking cover for the filler neck of a fuel tank for motor vehicles with a grip protruding from the blanking cover body such that the grip can be released from the blanking cover body in the event of a crash.

The end piece of the filler neck of a motor fuel tank, which end piece is closed by the blanking cover, is generally guided with radial clearance through an opening provided in a wall part of the body. The body wall part containing the opening then generally forms the bottom of a depression which can be closed by a flap and accepts the end piece of the filler neck.

During accident-caused bodywork deformation in a region of the body wall exhibiting the opening or depression, deformation of this wall region can occur in the course of which the peripheral edge of the opening meets the grip of the blanking cover and, consequently, either tears the blanking cover off the filler neck end piece or brings it into an oblique position on this end piece so that the filler neck opening is not fully closed.

In addition, a crash can lead, possibly in addition to a corresponding deformation of the wall region exhibiting the opening, to such a displacement of the fuel tank in the body that its filler neck is, at least partially pulled, out of the opening or depression, and the grip of the blanking cover finally likewise strikes the peripheral edge of the wall opening with the above-mentioned consequences.

An object of the present invention is to provide a blanking cover which ensures reliable filler neck sealing even in the case of a collision between its grip and a part of the body.

This object has been achieved in accordance with the present invention, by providing that the grip can be released from the blanking cover body under the action of forces caused by the crash.

BRIEF DESCRIPTION OF THE DRAWINGS

These and further objects, features and advantages will become more apparent from the following detailed description of a currently preferred embodiment of the present invention when taken in conjunction with the accompanying drawings wherein:

FIG. 1 is a longitudinal sectional view showing two embodiments of the blanking cover of the present invention;

FIG. 2 is a plan view of the blanking cover of FIG. 1; and

FIG. 3 is a cutaway view from underneath the blanking cover shown in FIGS. 1 and 2.

DETAILED DESCRIPTION OF THE DRAWINGS

The blanking cover has an inverted cup-shaped blanking cover body designated generally by the numeral 10 manufactured, for example, from deep-drawn steel sheet. The body 10 accepts a clamping device designated generally by the numeral 12 and an annular seal 14, both generally known pe se. In the clamped condition of the blanking cover on a filler neck, the annular seal 14 is supported on a seal base permanently connected to the filler neck (not shown). Bayonet fittings 18, 20 of a spring casing 16 of the clamping device 12 are used to fasten the blanking cover onto the seal base. The cup-shaped blanking cover body 10 is covered by a cap designated generally by the numeral 22 permanently attached thereto. The cap consists of a suitable brittle-fracture plastic material.

The cap 22 has an inverted cup-shape, and its cup wall 24 passes over the cup wall 26 of the blanking cover body 10. In one embodiment of the cap 22 shown on the right side of FIG. 1, the cup wall 24 of the cap 22 grips behind the end edge 30 of the cup wall 26 via engagement lugs 28, thus achieving the axial fixing of the blanking cover body 10 and the cap 22. As shown in FIG. 3, external beads 30 extending along generator lines spaced at an angular distance from one another are formed in the cup wall 26, and ribs 32 formed on the inner periphery of the cup wall 24 positively engage in these beads in order to provide torsional connection between the blanking cover body 10 and the cap 22.

A grip 36 diametrically extending protrudes outwardly from a portion 34 of the cap 22 and is used for gripping the blanking cover which preferably ends at a radial distance a from the external periphery of the cap cup wall 24. The portion 34 of the cap 22 has upper and lower surfaces wherein the lower surface is in contact with the blanking cover body 10 and wherein the grip 36 extends outwardly from the upper surface of the portion 34. An annular groove 38 is formed adjacent to the end of the cap cup wall 24 in the outer surface 40 of the portion 34 and forms a predetermined breaking point. Alternatively, a predetermined breaking point could also extend along the grip 36 itself.

If forces due to a crash act on the grip 36 when the filler neck is closed, this ensures that the grip will tear off from the portion 34 of the cap 22, particularly due to the annular groove-shaped predetermined breaking point 38, so that the blanking cover body 10 together with the residual part of the cap 22 remaining on it maintains the sealed position on the filler neck.

In another contemplated embodiment of the present invention as shown on the left side of FIG. 1, the cap 22 can be attached to the blanking cover body 10 such that it is entirely pushed down as a whole by the latter when forces act on the grip 36. In this case, reuse, if deemed appropriate, would be possible.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A blanking cover for the filler neck of a motor vehicle fuel tank, comprising:
   an inverted cup shape cover body having a bottom inside portion for carrying an annular seal and a clamping device for sealing axial clamping of the blanking cover onto a filling end of the filler neck;
   an inverted cup-shaped cap which accommodates the cover body therein and is fixedly mounted thereon;
   a grip web projecting from the cap; and
   a breaking zone operatively connecting said grip web to said cap, adjacent to an edge of the cap, for providing a predetermined breaking point to facilitate detachment of the grip web from the cap.

2. The blanking cover according to claim 1, wherein said breaking zone comprises an annular groove.

3. The blanking cover according to claim 1, wherein the cap is a plastic material, and the cover body is made up of a deep-drawn steel plate material.

4. The blanking cover according to claim 2, wherein the cap is a plastic material, and the cover body is made up of a deep-drawn steel plate material.

* * * * *